(12) United States Patent
Lisinski et al.

(10) Patent No.: US 9,981,633 B2
(45) Date of Patent: May 29, 2018

(54) HEATABLE COMPOSITE PANE HAVING A SECURITY FUNCTION

(75) Inventors: Susanne Lisinski, Cologne (DE);
Martin Melcher, Herzogenrath (DE);
Andreas Schlarb, Wuppertal (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 763 days.

(21) Appl. No.: 14/122,660

(22) PCT Filed: May 3, 2012

(86) PCT No.: PCT/EP2012/058128
§ 371 (c)(1),
(2), (4) Date: Feb. 13, 2014

(87) PCT Pub. No.: WO2012/168009
PCT Pub. Date: Dec. 13, 2012

(65) Prior Publication Data
US 2014/0151355 A1     Jun. 5, 2014

(30) Foreign Application Priority Data

Jun. 10, 2011   (EP) ................................. 11169563

(51) Int. Cl.
*H05B 3/22* (2006.01)
*H05B 3/28* (2006.01)
(Continued)

(52) U.S. Cl.
CPC .............. *B60S 1/026* (2013.01); *B32B 17/06* (2013.01); *B32B 17/10* (2013.01); *B32B 17/10036* (2013.01); *B32B 17/1077* (2013.01); *B32B 17/10174* (2013.01); *B32B 17/10761* (2013.01); *B32B 17/10788* (2013.01);
(Continued)

(58) Field of Classification Search
None
See application file for complete search history.

(56) References Cited

U.S. PATENT DOCUMENTS 3,892,947 A   7/1975   Strengholt
4,078,107 A   3/1978   Bitterice et al.
(Continued)

FOREIGN PATENT DOCUMENTS

DE   2344616    3/1975
DE   9313394    10/1993
(Continued)

OTHER PUBLICATIONS

International Search Report dated Jun. 21, 2012 for PCT/EP2012/058128 filed on May 3, 2012 in the name of Saint-Gobain Glass France—German to English Translation.
(Continued)

*Primary Examiner* — Joseph M Pelham
(74) *Attorney, Agent, or Firm* — Steinfl + Bruno, LLP (57) ABSTRACT

A composite pane is described. The composite pane has a first pane, at least one intermediate layer, a second pane, a transparent, electrically conductive first coating between the intermediate layer and the first pane and/or between the intermediate layer and the second pane, a first busbar and a second busbar, and a transparent, electrically conductive second coating.

20 Claims, 10 Drawing Sheets

(51) Int. Cl.
  *B32B 17/06* (2006.01)
  *B60S 1/02* (2006.01)
  *B32B 17/10* (2006.01)
  *H05B 3/86* (2006.01)

(52) U.S. Cl.
  CPC ......... *H05B 3/86* (2013.01); *H05B 2203/013* (2013.01); *H05B 2203/031* (2013.01); *H05B 2214/02* (2013.01); *Y10T 428/31645* (2015.04)

(56) References Cited

U.S. PATENT DOCUMENTS

| | | | |
|---|---|---|---|
| 4,808,799 | A | 2/1989 | Schave |
| 5,911,899 | A * | 6/1999 | Yoshikai ............... H05B 3/86 219/451.1 |
| 6,406,928 | B1 * | 6/2002 | Jen ....................... G02F 1/1362 349/141 |
| 6,933,051 | B2 * | 8/2005 | Fleming ................... B32B 7/10 219/203 |
| 8,692,168 | B2 * | 4/2014 | Benda ................. A61H 33/063 219/213 |
| 2006/0061008 | A1 * | 3/2006 | Karner ............... B29C 45/0017 264/250 |
| 2007/0184282 | A1 * | 8/2007 | Hauser ............. B32B 17/10036 428/426 |
| 2008/0212189 | A1 * | 9/2008 | Baur ................. B32B 17/10174 359/604 |
| 2008/0237219 | A1 * | 10/2008 | Takeuchi ................. H05B 3/84 219/522 |
| 2009/0297132 | A1 * | 12/2009 | Abbott ..................... B32B 7/02 392/407 |
| 2011/0081135 | A1 * | 4/2011 | Felder ................. A21C 15/002 392/407 |
| 2012/0000896 | A1 * | 1/2012 | Phan ....................... H05B 3/86 219/203 |
| 2012/0017975 | A1 * | 1/2012 | Giron ................ B32B 17/10036 136/252 |
| 2013/0019618 | A1 * | 1/2013 | Veerasamy ....... B32B 17/10036 62/85 |
| 2013/0024169 | A1 * | 1/2013 | Veerasamy ....... B32B 17/10036 703/2 |
| 2013/0092676 | A1 * | 4/2013 | Offermann ........ B32B 17/10036 219/203 |
| 2013/0277352 | A1 * | 10/2013 | Degen ..................... H05B 3/84 219/203 |
| 2013/0299479 | A1 * | 11/2013 | Laurent ................... H05B 3/86 219/203 |
| 2015/0096969 | A1 * | 4/2015 | Uprety .................. B64D 15/12 219/203 |

FOREIGN PATENT DOCUMENTS

| | | |
|---|---|---|
| DE | 4235063 | 4/1994 |
| DE | 10325476 | 12/2004 |
| DE | 10333618 | 3/2005 |
| DE | 10352464 | 6/2005 |
| DE | 202004019286 | 4/2006 |
| DE | 69731268 | 9/2006 |
| DE | 202008017611 | 4/2010 |
| EP | 0025755 | 3/1981 |
| EP | 0847965 | 6/1998 |
| EP | 2139049 | 12/2009 |
| EP | 2200097 | 6/2010 |
| JP | 2009196400 A | 9/2009 |

OTHER PUBLICATIONS

Written Opinion dated Jun. 21, 2012 for PCT/EP2012/058128 filed on May 3, 2012 in the name of Saint-Gobain Glass France—German to English translation.

* cited by examiner

Prior Art

Figure 2A

Prior Art

HEATABLE COMPOSITE PANE HAVING A SECURITY FUNCTION

CROSS REFERENCE TO RELATED APPLICATIONS

The present application is the US national stage of International Patent Application PCT/EP2012/058128 filed on Apr. 3, 2012 which, in turn, claims priority to European Patent Application EP 11169563.1 filed on Jun. 10, 2011.

The invention relates to a pane with an electrically heatable coating, in particular, an electrically heatable motor vehicle pane, having a safety function. The invention further relates to a method for producing the pane according to the invention and the use of the pane according to the invention as a motor vehicle pane, in particular, as a motor vehicle pane for electric vehicles.

The term "electric vehicles" refers to motor vehicles that are driven by electrical energy. The driving energy is, for the most part, carried along in the motor vehicle in the form of chargeable accumulators and rechargeable batteries or generated in the motor vehicle itself by fuel cells. An electric motor converts the electrical energy into mechanical energy for locomotion. The onboard voltage of electric vehicles is typically from 100 V to 400 V.

Because of the limited energy storage density of accumulators or rechargeable batteries, the driving range of electric vehicles is quite limited. Consequently, the efficient use of electrical energy is of particular significance with electric vehicles.

The same requirements are imposed on the glazing of electric vehicles as on the glazing of motor vehicles with internal combustion engines. The following legal regulations apply with regard to the size of the field of vision and the structural stability of the panes:

ECE R 43: "Uniform Provisions concerning the Approval of Safety Glazing and Composite Glass Materials" as well as Technical Requirements for Vehicle Components in the Design Approval Test §22 a StVZO [German Regulation Authorizing the Use of Vehicles for Road Traffic], No. 29 "Safety Glass".

These regulations are fulfilled, as a rule, by composite glass panes. Composite glass panes consist of two or more individual panes, in particular, made of float glass, and are fixedly bonded to one another with heat and pressure by one or a plurality of intermediate layers. The intermediate layers are, for the most part, made of thermoplastics such as polyvinyl butyral (PVB) or ethylene vinyl acetate (EVA).

The field of vision of a motor vehicle pane must be kept free of ice and condensation. In the case of motor vehicles with internal combustion engines, engine heat is, as a rule, used to heat a stream of air. The warm stream of air is then directed to the panes. This method is unsuitable for electric vehicles since electric vehicles do not have engine heat. The generation of warm air from electrical energy is not very efficient.

Alternatively, the pane can have an electrical heating function. DE 103 52 464 A1 discloses a composite glazing with two glass panes. Wires running parallel to each other are inserted between the glass panes. When a voltage is applied to the wires, an electrical current flows. The glass pane is heated by the development of Joule heat due to current flow resistance. Because of design and safety aspects, the number of wires in the glass as well as the diameter of the wires must be kept as small as possible. The wires must not be visible or must be hardly perceptible in daylight and at night with headlight illumination.

More suitable are transparent, electrically conductive coatings, as are known from DE 103 33 618 B3. There, a glass pane has an electrically heatable silver layer. Coatings based on thin silver layers can be produced cost-effectively and are resistant to aging.

DE 103 25 476 B3 describes a panel element with at least one rigid pane that supports an electrically conductive, heatable coating as well as an electrically conductive partial surface that is electrically insulated from the coating and is provided with at least one electrical connection of its own. According to the invention, the partial surface is provided for connection to a ground potential.

Conventional heaters with electrically conductive coatings are operated with the customary onboard voltage with a DC voltage of 12 V to 14 V or, in the case of higher required heat output, with DC voltages up to 42 V. The sheet resistance is, depending on the voltage available and the necessary heat output, between 0.5 ohm and 5 ohm. Under these conditions, an iced windshield can be deiced in 5 to 10 minutes in winter.

In electric cars, it is desirable to operate the layer heating with the typical onboard voltage for electric cars of 100 V to 400 V. The reduction of operating voltages of more than 100 V to 42 V or 14 V, for example, by a power adapter, is very inefficient in terms of energy. In addition, high voltages of 100 V to 400 V enable a short deicing time of, for example, 1 minute with 3 kW of heating output. Such short deicing times are not possible in accordance with the current prior art with operating voltages of 12 V to 42 V.

Depending on the operating voltage used, special safety precautions are necessary. In accordance with the European Low-Voltage Directive 2006/95/EC, DC voltages up to 75 V are considered to be harmless such that protection against direct contact can be dispensed with. Panes with electrically heatable coatings according to the prior art are operated with voltages of 12 V to 42 V and, consequently, require no special safety precautions.

Already from a DC voltage of 75 V, upon contact, a risk of injury from cramps and uncontrollable muscle contractions must be assumed. At voltages above 120 V, direct contact is considered life-threatening even for adults and must be avoided under all circumstances. With use in a motor vehicle, contact is possible when, in the case of an accident, the insulation is removed from the voltage-carrying coating. The same holds for destruction and damage to the pane through external action such as rock impact, vandalism, or in the case of rescue and recovery attempts.

In principle, the same considerations also apply to layer heaters that are operated with AC voltage, with the safety-relevant limits lower in this case. Thus, starting from an AC voltage of 25 V, there is a severe risk of injury; and from an AC voltage of 50 V, a severe threat to life.

The object of the present invention consists in providing a composite pane with a transparent, electrically conductive coating that has adequate heating output at a DC voltage of 75 V to 450 V or an AC voltage of 25 V to 450 V and includes suitable safety precautions.

The object of the present invention is accomplished according to the invention by a composite pane with a transparent, electrically heatable coating in accordance with claim 1. Preferred embodiments emerge from the subclaims. A method for producing a composite pane according to the invention and a use of the composite pane emerge from other claims.

The composite pane according to the invention comprises:
at least one first pane and a second pane,
at least one Intermediate layer, which connects the panes to each other,
at least one transparent, electrically conductive first coating, which is arranged between the intermediate layer and the first pane or between the intermediate layer and the second pane,
at least one first busbar and a second busbar, which are connected to the first coating, and the first busbar is connected to a ground potential and the second busbar is connected to a DC voltage of 75 V to 450 V, and
at least one transparent, electrically conductive second coating, which is arranged insulated from the first coating,
wherein the area of the first coating and the area of the second coating are arranged one over another with at least 80% congruence and the second coating is connected via at least one third busbar to the ground potential.

In a preferred embodiment of the composite pane according to the invention, the second busbar is connected to a DC voltage of 120 V to 450 V. In this voltage range, direct contact is considered life-threatening even for adults and must be avoided under all circumstances.

In an alternative embodiment of the composite pane according to the invention, the second busbar is connected to an AC voltage of 25 V to 450 V. In a preferred embodiment of the composite pane according to the invention, the second busbar is connected to an AC voltage of 50 V to 450 V. In this voltage range, direct contact is considered life-threatening even for adults and must be avoided under all circumstances. In another preferred embodiment of the composite pane according to the invention, the second busbar is connected to an AC voltage of 100 V to 300 V. This voltage range is particularly advantageous for the use of the composite pane in furniture, devices, and buildings, in particular for electric heaters, since AC voltages of 100 V to 300 V are available as standard household supply voltages.

The composite pane according to the invention includes at least two panes that are connected to each other by at least one intermediate layer. Basically, all transparent, electrically insulating substrates that are thermally and chemically stable as well as dimensionally stable under the conditions of production and use of the composite pane according to the invention are suitable as panes.

The panes preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof.

Examples of suitable glasses types are known from the German translation of the European patent EP 0 847 965 B1 with the file number DE 697 31 268 T2, page 8, paragraph [0053].

The thickness of the panes can vary widely and can thus be excellently adapted to the requirements of the individual case. Preferably, panes with the standard thicknesses of 1.0 mm to 25 mm, preferably of 1.4 mm to 2.5 mm, are used for motor vehicle glass and preferably of 4 mm to 25 mm are used for furniture, devices, and buildings, in particular for electric heaters. The size of the panes can vary widely and is determined according to the size of the application according to the invention.

The panes can have any three-dimensional shape. Preferably, the three-dimensional shape has no shadow zones, such that it can be coated, for example, by cathode sputtering. Preferably, the substrates are planar or slightly or greatly bent in one direction or in multiple spatial directions; planar substrates are, in particular, used. The panes can be colorless or colored.

The panes are connected to each other by at least one intermediate layer. The intermediate layer preferably contains a thermoplastic plastic, such as polyvinyl butyral (PVB), ethylene vinyl acetate (EVA), polyurethane (PU), polyethylene terephthalate (PET), or multiple layers thereof, preferably with thicknesses of 0.3 mm to 0.9 mm.

The composite pane according to the invention contains at least one transparent and electrically conductive first coating, which is arranged on one side of one of the individual panes of the composite pane turned toward the intermediate layer. The first coating can be applied directly onto the individual pane. The first coating can alternatively be applied on a carrier film or on the intermediate layer itself.

The transparent, electrically conductive coating according to the invention is permeable to electromagnetic radiation, preferably electromagnetic radiation of a wavelength of 300 to 1,300 nm, in particular, to visible light. "Permeable" means that the total transmission of the composite pane complies with the legal regulations, and, in particular, is, for visible light, preferably, >70% and, in particular, >80%.

Such coatings are known, for example, from DE 20 2008 017 611 U1 [utility model] and EP 0 847 965 B1. They are made, as a rule, from a metal layer such as a silver layer or silver-containing metal alloy that is embedded between at least two coatings made of a dielectric material of the metal oxide type. The metal oxide contains, preferably, zinc oxide, tin oxide, indium oxide, titanium oxide, silicon oxide, aluminum oxide, or the like, as well as combinations of one or a plurality thereof. The dielectric material can also contain silicon nitride, silicone carbide, or aluminum nitride.

Preferably, metal layer systems with a plurality of metal layers are used, wherein the individual metal layers are separated by at least one layer made of dielectric material.

This layer structure is generally obtained by a sequence of deposition processes that are performed by a vacuum method such as magnetic field-assisted cathode sputtering. Very fine metal layers, which contain, in particular, titanium, nickel, chromium, nickel-chromium, or niobium, can also be arranged on both sides of the silver layer. The bottom metal layer serves as a bonding and crystallization layer. The top metal layer serves as a protective and getter layer to prevent a change in the silver during the further process steps.

The thickness of the transparent, electrically conductive coating can vary widely and be adapted to the requirements of individual case. It is essential that the thickness of the electrically conductive, transparent coating not be so great that it largely absorbs or reflects electromagnetic radiation, preferably electromagnetic radiation of a wavelength of 300 to 1,300 nm.

The present invention is substantially based on the concept that a high voltage is only hazardous to a human being when the current can flow through parts of the human body. In the context of the present invention, a high voltage means a DC voltage of more than 75 V or an AC voltage of more than 25 V. With such high voltages, a health-damaging current flow through the human body usually occurs upon contact.

Consequently, it is vital to provide a composite pane with an electrically heatable first coating that, in the event of operation with a high voltage, reduces the possibility of current flow through the human body, in particular when the composite pane is damaged or destroyed.

Accordingly, the composite pane according to the invention includes at least one transparent, electrically conductive second coating, which is arranged electrically insulated from the first coating.

In a composite pane, contact protection of the high-voltage-carrying first coating is ensured by the two fixed panes and the intermediate layer. Through the stabilizing action of the intermediate layer, which contains a tough elastic plastic, the contact protection remains effective even with a shattered pane.

Consequently, the real danger of contact with the high-voltage-carrying first coating consists in the penetration of a metal object into the pane. This can occur, for example, directly during an accident or when rescue workers cut through the pane with an ax or a saw in a recovery effort.

An openly accessible first coating is also hazardous, for example, through fragment detachment on the side of the composite pane next to the vehicle interior after a massive external action or after a complete puncture of the composite pane.

In order to prevent a current flow through the human body in these cases with contact, a transparent, electrically conductive second coating according to the invention is arranged in or on the composite pane. The second coating is connected to the ground potential of the onboard power supply or to another low potential that is not hazardous to humans.

The second coating is arranged electrically insulated relative to the first coating. Moreover, the area of the first coating and the area of the second coating are arranged one over the other with at least 80% congruence, preferably 90%, and particularly preferably 95%. The first and/or the second coating can form a closed area or can be subdivided into smaller areas, with all parts having to be electrically conductively connected to the appropriate potentials.

In an advantageous embodiment of the composite pane according to the invention, the second coating is arranged on the side of the intermediate layer opposite the first coating. This has the particular advantage that the first coating and the second coating are electrically insulated by the intermediate layer and, thus, no additional insulating layer is necessary. Moreover, the first coating and the second coating are arranged in the interior of a composite pane and are mechanically as well as chemically protected, for example, against corrosion, by the first pane and the second pane.

In another advantageous embodiment of the composite pane according to the invention, the second coating is arranged on at least the outer side the first pane or the outer side of the second pane. In the context of the present invention, "outer side" means the external side of the composite pane and, thus, the side of each individual pane facing away from the intermediate layer. From a technical standpoint, this embodiment has the advantage that a composite pane produced according to the prior art with only a first coating can be very easily supplemented by a second coating.

In another advantageous embodiment of the composite pane according to the invention, the first and/or the second coating are arranged on a plastic film. The plastic film can be bonded surface-wise on its front and on its back to another plastic film in each case. Such a composite can comprise, for example, an intermediate layer made of polyvinyl butyral (PVB), a polyethylene terephthalate (PET) film coated with a first or second coating, and an insulating layer made of polyvinyl butyral (PVB). The thickness of the polyvinyl butyral (PVB) film is, for example, 0.3 mm to 0.5 mm. The thickness of the polyethylene terephthalate (PET) film is, for example, 40 µm to 80 µm and, in particular, 50 µm.

In another advantageous embodiment of the composite pane according to the invention, the second coating is bonded to the first coating via an additional insulating layer. The insulating layer preferably contains a plastic film with suitable electrically insulating properties, particularly preferably, a film that contains polyvinyl butyral (PVB), ethylene vinyl acetate (EVA), polyurethane (PU), or polyethylene terephthalate (PET). Alternatively, the insulating layer can include an electrically insulating oxide or nitride layer or a dielectric layer. This embodiment has the particular advantage that the first and second coating are arranged very near each other, which improves the protective effect by the second coating. Thus, the insulating layer can be implemented very thin and with low mechanical resistance. In the case of destruction or breakage of the pane, a direct short-circuit occurs, as a rule, between the first and the second coating such that a current flow from the first coating to the second coating occurs. On the one hand, such a current flow causes a voltage drop in the first coating into a range that is not hazardous to human beings. Also, a high current flow is caused by this such that, as a rule, the electrical fuse protection of the first coating is triggered and the voltage supply is interrupted.

In another advantageous embodiment of the composite pane according to the invention, the front of the first coating is connected via an insulating layer to a second coating and the back of the first coating is connected via another insulating layer to an additional second coating. In other words, the composite pane includes a layer sequence of a second coating, an insulating layer, the first coating, another insulating layer, and an additional second coating. Here, "front" of the first coating means, for example, the side that faces away from the motor vehicle interior when the pane is installed in a motor vehicle. The additional second coating is connected to the ground potential via another busbar. This embodiment has the particular advantage that the first coating is covered on both sides by a second coating connected to the ground potential. Thus, it is virtually impossible to contact the first coating, for example, with a metal object without also contacting at least one of the two second coatings. Moreover, in the event of destruction or breakage of the pane, an immediate short-circuit between the first and one of the second coatings occurs such that a current flow from the first coating to one of the second coatings takes place. The additional second coating preferably contains the same layer or layer sequence as the second coating.

Generally, it is to be assumed that in the event of the cases of damage described, the very presence of only one second coating connected to the ground potential, regardless of the embodiment selected, offers adequate protection. In a destroyed pane, it is virtually impossible to contact only the first coating but not the second coating.

The second coating can contain the material of the first coating or be identical thereto. In a preferred embodiment of the invention, the second coating is suited to transport a relatively high current density without damage. This has the particular advantage that the electrical fuse protection of the first coating is triggered quickly in the event of destruction of the composite pane and, thus, the first coating is quickly switched voltage free. In addition, a local overheating of the second coating is prevented. The local overheating could result in a likewise local destruction of the second coating and reduce the functionality of the safety precaution.

In an advantageous embodiment of the composite pane according to the invention, the transparent, electrically conductive first coating has a sheet resistance of 1 ohm/square to 10 ohm/square, preferably of 3 ohm/square to 5 ohm/square. The transparent, electrically conductive second coating advantageously has a sheet resistance of 0.1 ohm/square to 10 ohm/square. In a preferred embodiment, the transparent, electrically conductive second coating has a sheet resistance of 0.4 ohm/square to 10 ohm/square, particularly preferably of 0.4 ohm/square to 10 ohm/square and very particularly preferably of 0.4 ohm/square to 5 ohm/square.

As experiments of the inventor demonstrated, transparent, electrically conductive second coatings with high sheet resistances of more than 5 ohm/square and, in particular of more than 10 ohm/square are adequate for a desired safety function. In the event of making contact with the transparent, electrically conductive first coating through the transparent, electrically conductive second coating and simultaneous contact by a person, a voltage divider is formed through the dissipation of the current through the transparent, electrically conductive second coating and the person. Due to the high resistance of the human body, only a small current flow through the person occurs.

In an advantageous embodiment of the composite pane according to the invention, the transparent, electrically conductive first coating and/or the transparent, electrically conductive second coating includes silver (Ag), indium tin oxide (ITO), fluorinated tin oxide ($SnO_2$:F), or aluminum-doped zinc oxide (ZnO:Al).

In an advantageous embodiment of the composite pane according to the invention, the transparent, electrically conductive second coating has an emissivity of less than 50%. The second coating is then preferably situated on the external side of a composite pane facing the motor vehicle interior and/or the external side of the composite pane facing away from the vehicle interior.

The second coating preferably includes a layer system, with at least one functional layer based on at least one metal or metal oxide from the group consisting of niobium, tantalum, molybdenum, and zirconium, and a dielectric layer arranged on the motor vehicle interior side of the functional layer.

In an advantageous embodiment of the composite pane according to the invention, the area of the first coating and the area of the second coating (6) are arranged one over the other with 100% congruence. Alternatively, the area of the second coating can protrude beyond the area of the first coating, preferably by more than 10%, particularly preferably by more than 25%.

In an advantageous embodiment of the composite pane according to the invention, at least one transparent, electrically conductive layer is situated on at least one of the internal sides of the panes. Here, "internal side" of the pane means each of the sides facing the thermoplastic intermediate layer. In the case of a pane composite of two panes, a transparent, electrically conductive layer can be situated on the internal side of one or the other pane. Alternatively, a transparent, electrically conductive layer can also be situated in each case on each of the two internal sides. In the case of a pane composite of more than two panes, multiple transparent, electrically conductive layers can also be situated on multiple internal sides of the panes. Alternatively, a transparent, electrically conductive coating can be embedded between two thermoplastic intermediate layers. The transparent, electrically conductive coating is then preferably applied on a carrier film or carrier pane. The carrier film or carrier pane preferably includes a polymer, in particular polyvinyl butyral (PVB), ethylene vinyl acetate (EVA), polyurethane (PU), polyethylene terephthalate (PET), or combinations thereof.

In an advantageous embodiment of the composite pane according to the invention, the transparent, electrically conductive first coating has n incisions, where in n is a whole number ≥1, such that the resistance of the first transparent, electrically conductive coating has a heating output of 300 W/m² to 4000 W/m² with a DC voltage of 75 V to 450 V or an AC voltage of 25 V to 450 V.

The incisions separate the coating into regions electrically insulated from each other. The incisions can separate the coating into regions completely electrically insulated from one another. These regions can be connected serially or in parallel by busbars. Alternatively, or in combination therewith, the incisions can divide the coating only in sections. The result is that the current flows meanderingly through the coating. This lengthens the path of the current through the coating and increases the total resistance of the coating.

The precise number, the precise positioning, and the length of the incisions to obtain a desired total resistance can be determined by simple tests or simulations. The incisions are preferably designed such that the view through the composite pane is only slightly or not all impaired and the most homogeneous distribution possible of the heating output results.

In a first approximation, the length of the current path 1 results from:

$$l = \sqrt{\frac{U^2}{P_{spez} \cdot R_{Quadrat}}}$$

where U is the operating voltage, $P_{spez}$ is the specific heating output, and $R_{Quadrat}$ is the sheet resistance of the transparent, electrically conductive coating. The quotient of the length of the current path I and the width of the pane d yields, by way of approximation, the number of regions electrically insulated from one another in series. Based on the resistance measured, it is possible to fine-tune the desired total resistance by simple geometric modifications.

The incisions in the transparent, electrically conductive coating are preferably made using a laser. Methods for structuring thin metal foils are known, for example, from EP 2 200 097 A1 or EP 2 139 049 A1. Alternatively, the incisions can be made by mechanical ablation as well as by chemical or physical etching. The minimum width of the incisions must be adapted to the voltage to be insulated against and is, preferably, 10 μm to 500 μm, particularly preferably 50 μm to 100 μm.

In a preferred embodiment of the composite pane according to the invention, the transparent, electrically conductive first coating extends over at least 90% of the surface area of the side of the pane on which it is applied.

The transparent, electrically conductive coatings extend, preferably, over the entire surface area of the side of the pane on which they are applied, minus a peripheral frame-like decoated region with a width of 2 mm to 20 mm, preferably of 5 mm to 10 mm. This serves for electrical insulation between the voltage-carrying coating and the motor vehicle body. The decoated region is preferably hermetically sealed as a vapor diffusion barrier by the intermediate layer or an acrylate adhesive. The corrosion-sensitive coating is protected against moisture and atmospheric oxygen by the vapor diffusion barrier. In addition, the transparent, electrically conductive coatings can be decoated in another region that serves as a data transmission window or communication window.

In an advantageous embodiment of the composite pane according to the invention, the incisions are implemented such that they separate the transparent, electrically conductive first coating into at least three regions electrically insulated from one another. The regions are connected to each other via at least one third busbar. The separation of the regions and their connection via the busbars yields a lengthening of the path of the current through the transparent, electrically conductive first coating. The lengthening of the current path results in an increase in the electrical resistance.

The transparent, electrically conductive coatings are connected to collecting conductors, so-called "busbars", for the transmission of electrical power. Examples of suitable busbars are known from DE 103 33 618 B3 and EP 0 025 755 B1.

The busbars according to the invention are produced by printing of a conductive paste that is baked in before the bending and/or at the time of the bending of glass panes. The conductive paste preferably contains silver particles and glass frits. The layer thickness of the baked-in silver paste is, in particular, from 5 μm to 20 μm.

In an alternative embodiment of the busbars according to the invention, thin and narrow metal foil strips or metal wires, which preferably contain copper and/or aluminum, are used; in particular, copper foil strips with a thickness of 50 μm are used. The width of the copper foil strips is, preferably, from 1 mm to 10 mm. The metal foil strips or metal wires are placed on the coating at the time of the assembly of the composite layers. In the subsequent autoclave process, a secure electrical contact between the busbars and the coating is obtained through the action of heat and pressure. The electrical contact between the coating and busbars can, however, also be produced by soldering or bonding with an electrically conductive adhesive.

In the automotive sector, foil conductors are customarily used as feed lines for contacting busbars in the interior of composite panes. Examples of foil conductors are described in DE 42 35 063 A1, DE 20 2004 019 286 U1, and DE 93 13 394 U1.

Flexible foil conductors, sometimes also called "flat conductors" or "flat-band conductors", are preferably made of a tinned copper strip with a thickness of 0.03 mm to 0.1 mm and a width of 2 mm to 16 mm. Copper has proved successful for such conductor tracks, since it has good electrical conductivity as well as good processability into foils. At the same time, material costs are low. Other electrically conductive materials that can be processed into foils can also be used. Examples for this are gold, silver, or tin and alloys thereof.

For electrical insulation and for stabilization, the tinned copper strip is applied to a carrier material made of plastic or laminated therewith on both sides. The insulation material contains, as a rule, a 0.025 mm to 0.05 mm thick polyimide-based film. Other plastics or materials with the required insulating properties can also be used. A plurality of conductive layers electrically insulated from each other can be situated in one foil conductor strip.

Foil conductors that are suitable for contacting electrically conductive layers in composite panes have a total thickness of only 0.3 mm. Such thin foil conductors can be embedded without difficulty in the thermoplastic adhesive layer between the individual glass panes.

Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum.

The feed lines according to the invention are guided out of the composite pane and are preferably connected to the operating voltage via control electronics.

A further aspect of the invention comprises a method for producing a composite pane according to the invention, wherein at least a) a first pane, an intermediate layer, and a second pane, a transparent, electrically conductive first coating, a transparent, electrically conductive second coating, a first busbar, a second busbar, and a third busbar are laminated to each other, and b) the first coating is connected via the first busbar and the second coating via the third busbar to a ground potential, and the first coating is connected via a second busbar to a DC voltage of 75 V to 450 V or an AC voltage of 25 V to 450 V.

The invention further comprises the use of the composite pane according to the invention in means of transportation for travel on land, in the air, or on water, in particular in motor vehicles, for example, as a windshield, rear window, side windows, and/or glass roof.

The composite pane according to the invention is preferably used as a motor vehicle window in means of transportation with a DC voltage of 120 V to 450 V or an AC voltage of 50 V to 450 V.

The composite pane according to the invention is further preferably used as a motor vehicle window in motor vehicles that are driven by conversion of electrical energy, in particular in electric vehicles. The electrical energy is drawn from accumulators, rechargeable batteries, fuel cells, or internal combustion engine driven generators.

The composite pane according to the invention is further used as a motor vehicle window in hybrid electric motor vehicles that are driven by conversion of another energy form besides conversion of electrical energy. The other energy form is preferably an internal combustion engine, in particular a diesel engine.

The composite pane according to the invention is further preferably used as well as a functional individual piece, and as a built-in part in furniture, devices, and buildings, in particular as an electrical heater.

The invention is explained in the following with reference to drawings. The drawings are a schematic representation and not true to scale. The drawings in no way restrict the invention.

Figure 1A:
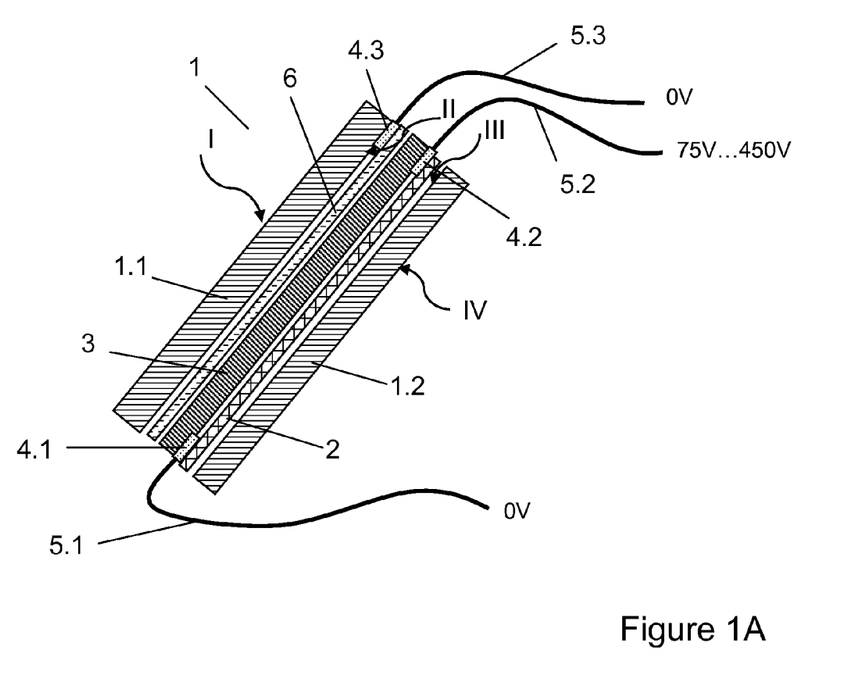
FIG. 1A a cross-sectional representation along the line A-A' of FIG. 1B through a composite pane implemented according to the invention, FIG. 1B a plan view of a composite pane implemented according to the invention, FIG. 2A a cross-sectional representation of a composite pane according to the prior art with a damaged area, FIG. 2B a cross-sectional representation of a composite pane according to the prior art under foreign body influence, FIG. 3 a cross-sectional representation of a composite pane implemented according to the invention under foreign body influence, FIG. 4 a cross-sectional representation of another exemplary embodiment of a composite pane implemented according to the invention, FIG. 5 a cross-sectional representation of another exemplary embodiment of a composite pane implemented according to the invention, FIG. 6 a cross-sectional representation of another exemplary embodiment of a composite pane implemented according to the invention, FIG. 7 a plan view of another exemplary embodiment of a composite pane implemented according to the invention, and FIG. 8 a flowchart of an exemplary embodiment of the method according to the invention.
Figure 1B:
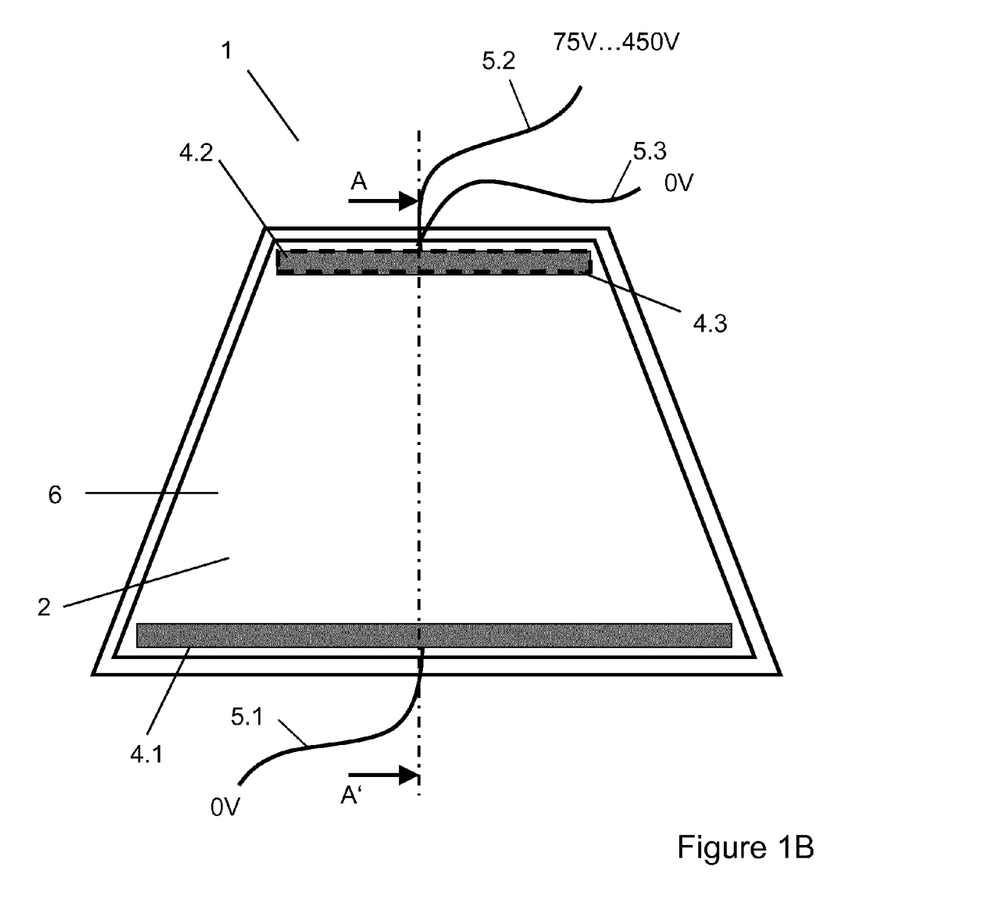

They depict:

FIG. 1A and FIG. 1B depict a composite pane implemented according to the invention designated with the reference character 1. FIG. 1B depicts a plan view of the composite pane 1; and FIG. 1A, a cross-sectional representation along the line A-A' of FIG. 1B.

The individual panes 1.1 and 1.2 of the composite pane 1 include float glass and have, in each case, thicknesses of 2.1 mm. The individual panes are bonded to one another with a thermoplastic intermediate layer 3. The thermoplastic intermediate layer 3 is made of a polyvinyl butyral (PVB) film 3 with a thickness of 0.76 mm. In the example depicted, a transparent, electrically conductive first coating 2 is applied on the side III of the inner pane 1.2 facing the thermoplastic intermediate layer 3. The first coating 2 is used to heat the composite pane 1. The first coating 2 can be applied either on the side II of the outer pane 1.1 facing the thermoplastic intermediate layer 3 or on both internal pane sides II and III.

In the example depicted, a transparent, electrically conductive second coating 6 is applied on the side II of the outer pane 1.1 facing the thermoplastic intermediate layer 3.

The first coating 2 and the second coating 6 are known, for example, from EP 0 847 965 B1 and include, in each case, two silver layers, which are, in each case, embedded between a plurality of metal and metal oxide layers. One exemplary layer sequence is presented in Table 1.

TABLE 1

| Material | Layer Thickness [nm] |
|---|---|
| $Si_3N_4$ | 9 |
| ZnO | 21 |
| Ti | 1 |
| Ag | 9 |
| Ti | 1 |
| ZnO | 16 |
| $Si_3N_4$ | 57 |
| ZnO | 16 |
| Ti | 1 |
| Ag | 10 |
| Ti | 1 |
| ZnO | 20 |
| $Si_3N_4$ | 18 |

The layer sequence has a sheet resistance of roughly 3 ohm/square to 5 ohm/square.

The first coating 2 extends over the entire surface area of the side III of the pane 1.2, minus a peripheral frame-like decoated region with a width of 8 mm. This serves for the electrical insulation between the voltage-carrying coating and the motor vehicle body. The decoated region is hermetically sealed by gluing to the intermediate layer 3.

The second coating 6 extends congruently over the entire surface area of the first coating 2.

A busbar 4.1 is situated, in the installed position, on the lower edge of the first coating 2; a busbar 4.2, on the upper edge. Another busbar 4.3 is situated, in the installed position, on the upper edge of the second coating 6. In the example depicted in FIG. 1B, the busbars 4.2 and 4.3 are arranged congruently one over the other. The busbars 4.1, 4.2, 4.3 extend over the entire width of the coatings 2, 6. The busbars 4.1, 4.2, 4.3 were printed on the coatings 2, 6 using a conductive silver paste and baked in. The busbars 4.1, 4.2, 4.3 are electrically conductively connected to the regions of the coatings 2, 6 located under them.

The feed lines 5.1, 5.2, and 5.3 are made of tinned copper foil with a width of 10 mm and a thickness of 0.3 mm. Feed line 5.1 is soldered to the busbar 4.1, feed line 5.2 is soldered to the busbar 4.2, and feed line 5.3 is soldered to the busbar 4.3.

On the outer pane 1.1, an opaque color coating with a width of 20 mm is applied like a frame on the edge of the inner side II as a masking print, which is not shown in the figure for reasons of clarity. The masking print conceals the view of a strand of adhesive with which the composite pane is bonded into the vehicle body. The masking print serves, at the same time, as protection of the adhesive against UV radiation and, thus, as protection against premature aging of the adhesive. Moreover, the busbars 4.1, 4.2, 4.3 and the feed lines 5.1, 5.2, 5.3 are concealed by the masking print.

The busbars 4.1 and 4.3 are connected to the ground potential of the onboard electrical system. The busbar 4.2 is connected to an onboard voltage of the vehicle. Alternatively, the onboard voltage can be transformed into a higher voltage or a lower voltage. In the case of an electric vehicle, the voltage is taken from batteries or accumulators and is roughly from 75 V to 450 V DC voltage and, for example, 400 V DC voltage. The voltage applied to the busbar 4.2 generates a current flow through the transparent, electrically conductive first coating 2. The first coating 2 heats up as a result of the current flow and, thus, heats the composite pane.

Figure 2A:
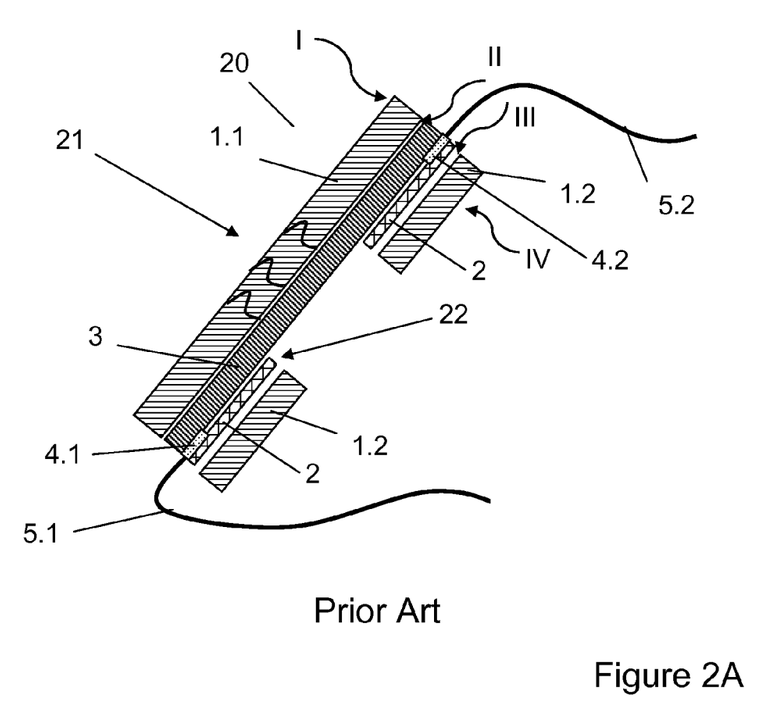
Figure 2B:
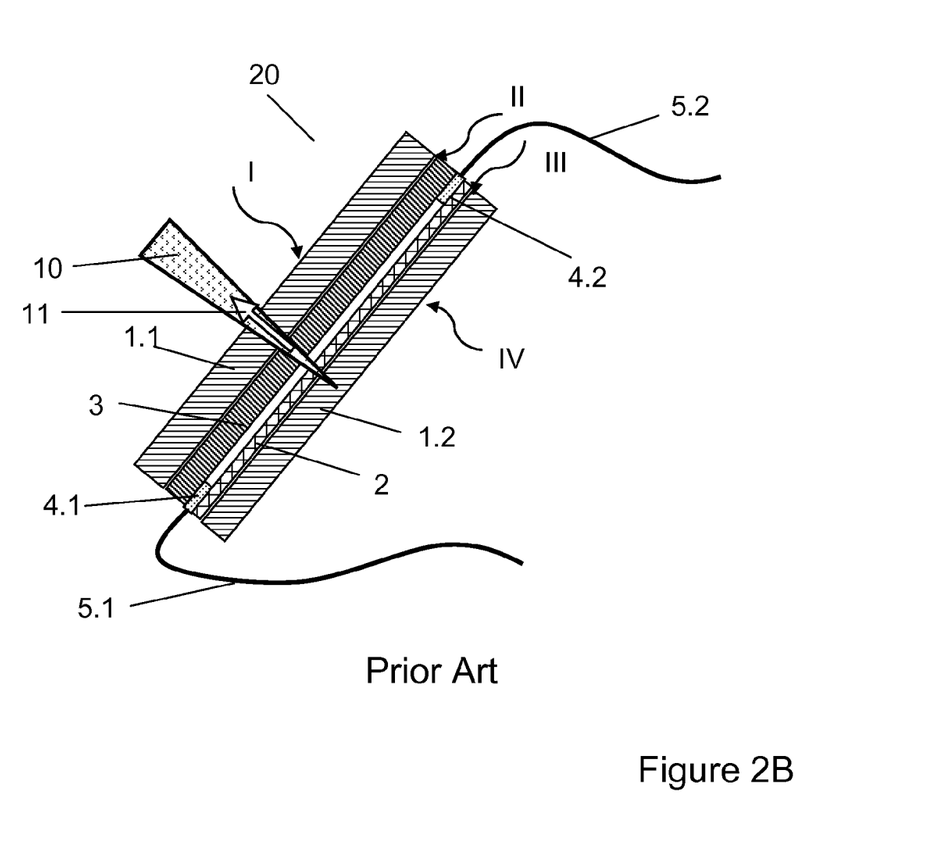

FIG. 2A and FIG. 2B depict, designated in each case with the reference character 20, a composite pane according to the prior art. The composite pane 20 includes a first coating 2, which serves to heat a composite pane 20. However, the composite pane 20 according to the prior art includes no second coating connected to a ground potential or to another voltage.

FIG. 2A depicts the composite pane 20 after an impact in the region 21. The impact results in fragment detachment on the individual pane 1.2 facing the vehicle interior. As a result of the fragment detachment, the first coating 2 is exposed in the region 22. The exposed first coating 2 makes it possible to contact the voltage-carrying first coating 2, which is hazardous to humans.

FIG. 2B depicts a composite pane 20 according to the prior art, in which a metal object 10 has pierced the first pane 1.1, the intermediate layer 3, and the first coating 2. The metal object 10 can, for example, be a rescue device such as a fireman's ax or a glass saw, which is conventionally used to rescue occupants in the case of an accident. The metal object 10 is thus in contact with the voltage-carrying first coating. Upon contacting the metal object 10 by a human body, a current flow 11 from the first coating 2 occurs via the metal object 10 through the human body. Due to the high DC voltages of 75 V to 450 V, there is an immediate health hazard for a person who touches the metal object 10.

Figure 3:
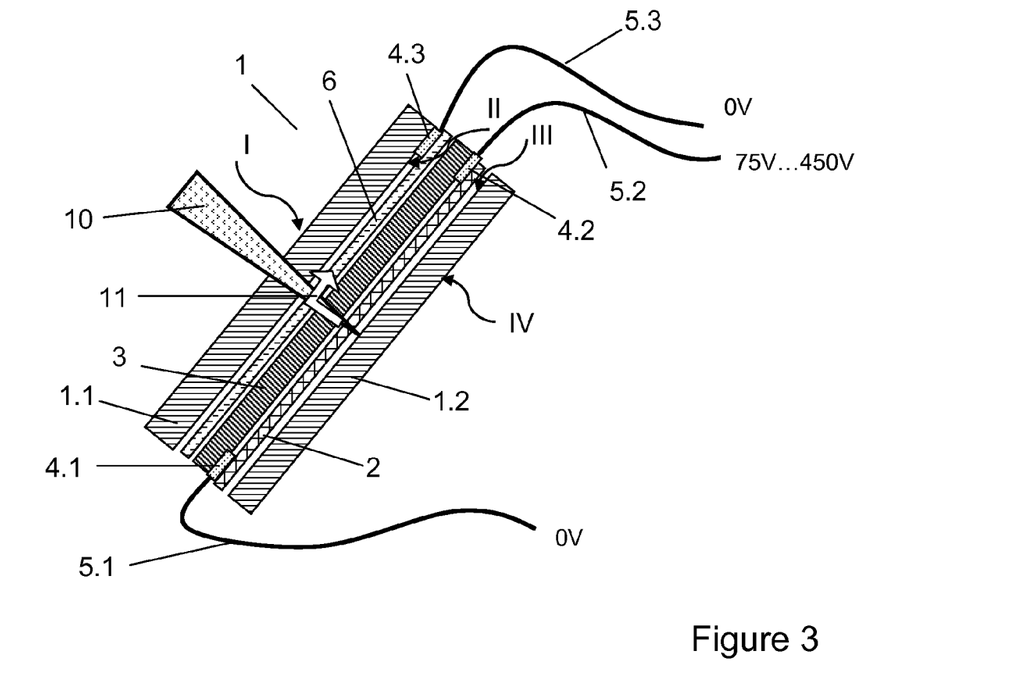

This hazard is prevented in a composite pane 1 according to the invention by a transparent, electrically conductive coating 2. FIG. 3 depicts a cross-sectional representation of a composite pane 1 according to the invention, into which a metal object 10 has penetrated. The second coating 2 is connected to the ground potential of the onboard voltage or to another low potential nonhazardous to humans. A current flow 11 from the first coating 2 to the second coating 6 occurs. As a rule, the high current flow will trigger the electrical fuse protection and interrupt the voltage supply to the first coating 2. Even if this is not the case, a human body has higher resistance than the second coating 6. As a result of this, no current flow hazardous to health occurs upon contact with the metal object 10.

Figure 4:
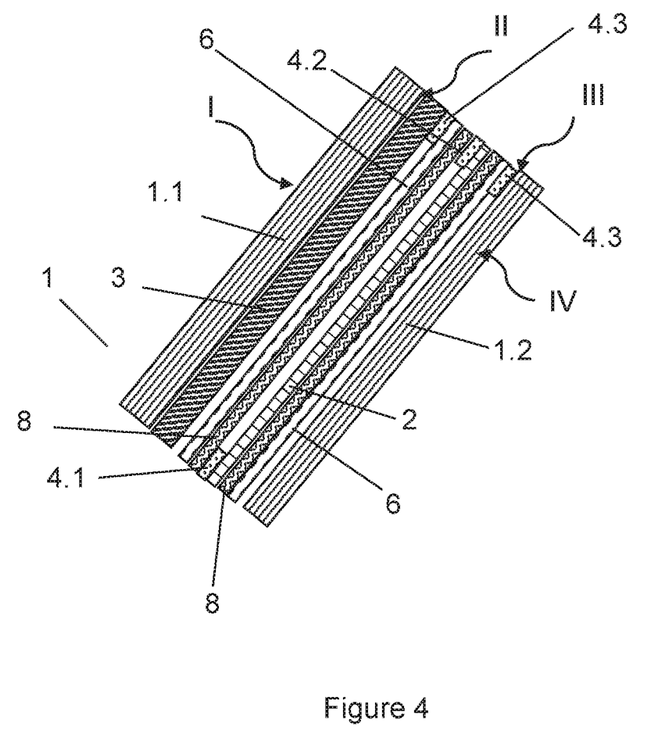

FIG. 4 depicts a cross-sectional representation of another exemplary embodiment of a composite pane implemented according to the invention 1. The composite pane 1 corresponds in its structure to the composite pane 1, as it has been described with regard to FIGS. 1A and B. However, the second coating 6 is connected via an insulating layer 8 to the first coating 2. The insulating layer 8 includes, for example, a film made of polyethylene terephthalate (PET) with a thickness of 50 μm.

Figure 5:
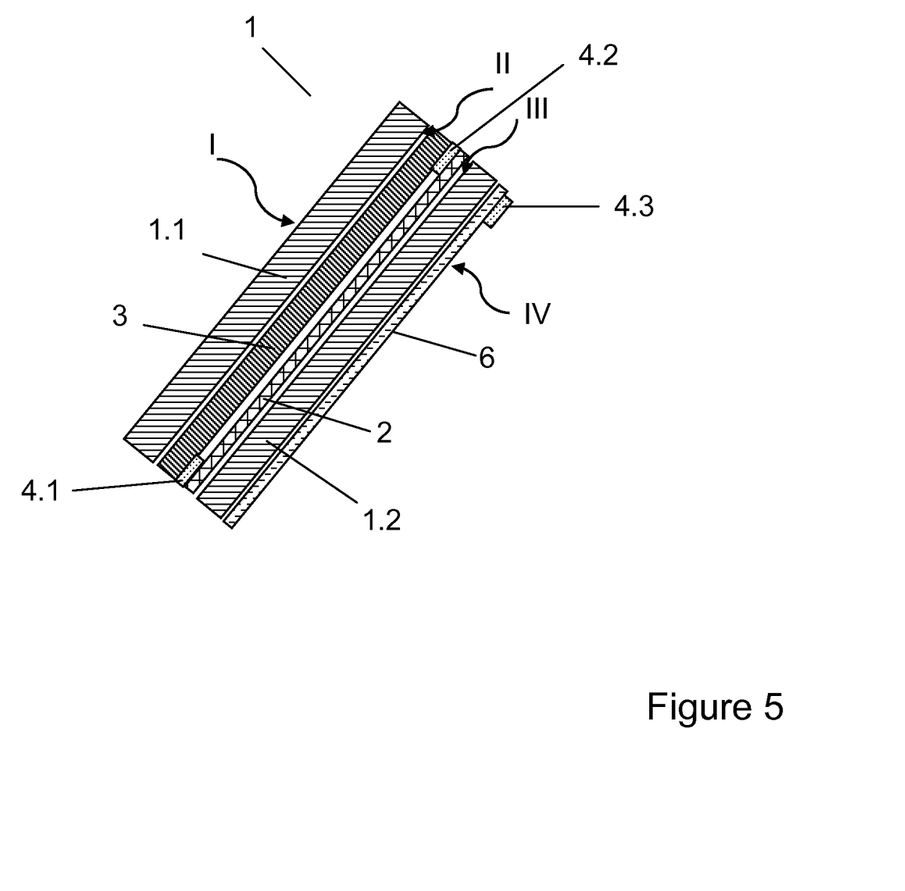

FIG. 5 depicts a cross-sectional representation of another exemplary embodiment of a composite pane implemented according to the invention 1. In this example, the second coating 6 is arranged on the side IV of the pane 1.2 facing the vehicle interior. The second coating 6 is in this case a layer with a low emissivity. The second coating 6 includes, for example, indium tin oxide (ITO).

Figure 6:
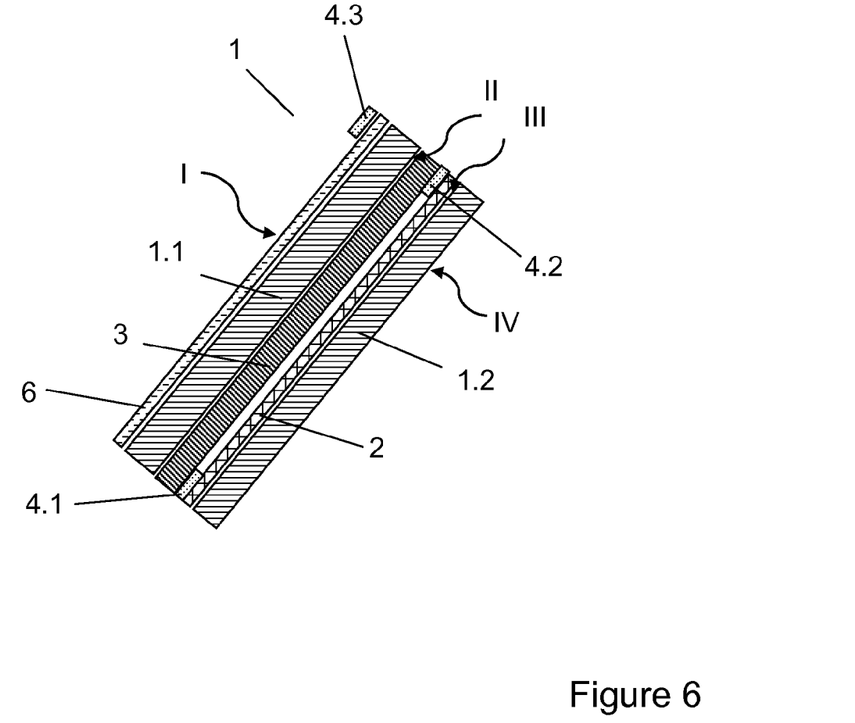

FIG. 6 depicts a cross-sectional representation of another exemplary embodiment of a composite pane implemented according to the invention 1. The composite pane 1 corresponds in its structure to the composite pane 1, as it has been described with regard to FIGS. 1A and B. However, the second coating 6 is arranged on the external side I of the composite pane 1.

Figure 7:
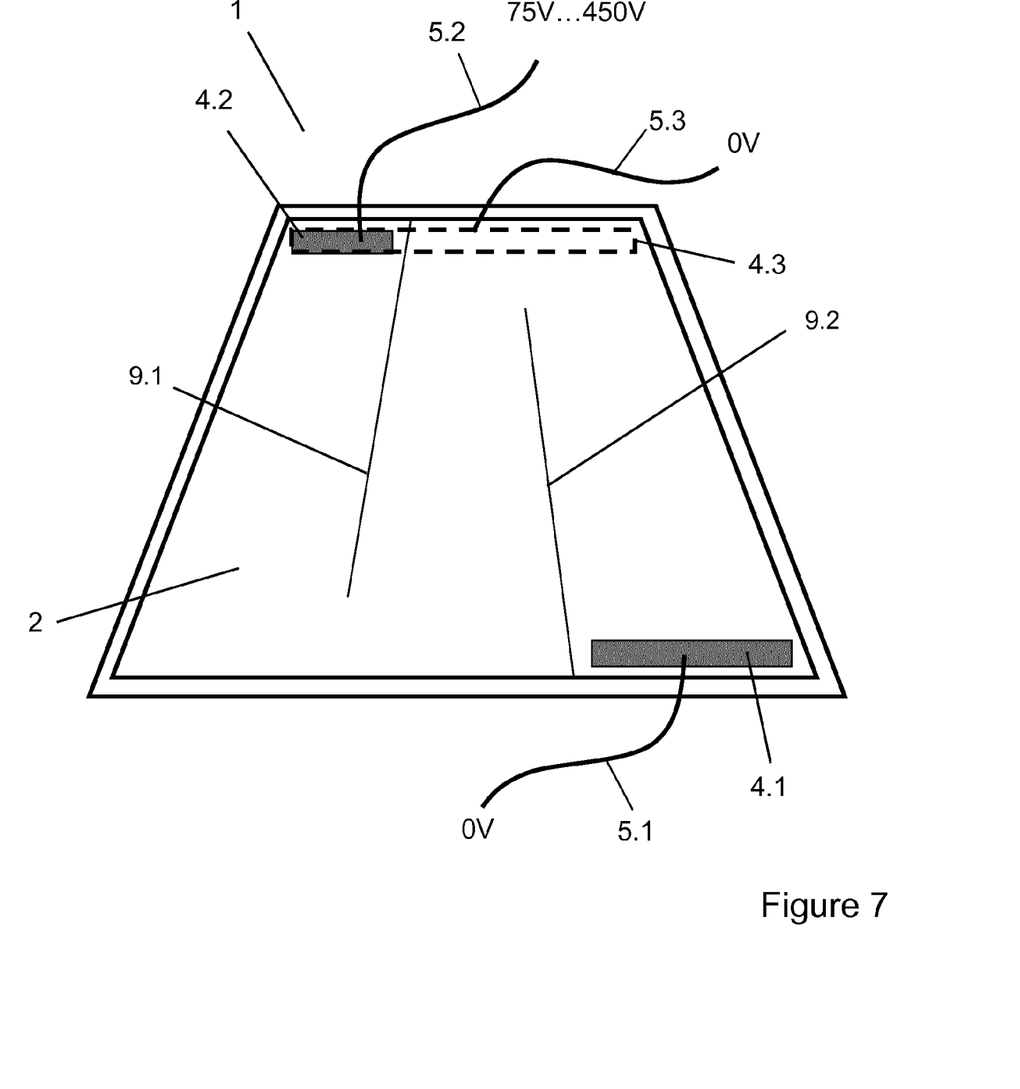

FIG. 7 depicts a plan view of another exemplary embodiment of a composite pane 1 implemented according to the invention. The first coating 2 has two incisions 9.1 and 9.2. The incisions 9.1, 9.2 were made in the first coating 2 with a focused laser beam. The second coating 6 is arranged congruently over the first coating 2, but includes no incisions.

When an operating voltage is applied to the busbars 4.1 and 4.2 via the feed lines 5.1 and 5.2, a current flows through the transparent, electrically conductive first coating 2. The path of the electric current is lengthened by the incisions 9.1 and 9.2, and the resistance of the first coating 2 between the busbars 4.1 and 4.2 is increased.

The busbar 4.3 is arranged, in the installed position, on the upper edge of the second coating 6 and extends over the entire upper edge of the composite pane 1, minus a narrow edge region.

Figure 8:
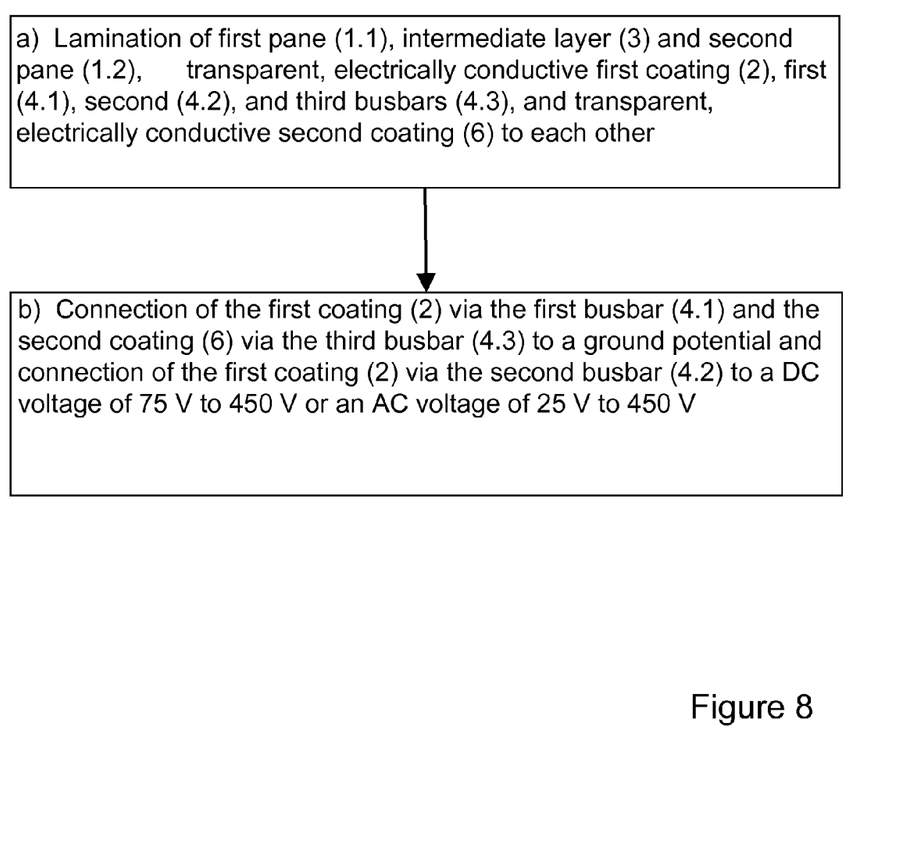

FIG. 8 depicts a flowchart of an exemplary embodiment of the method according to the invention.

Tests were conducted wherein a metal object 10 in the shape of a metal wedge was punched into a composite pane 20 according to the prior art and into a composite pane 1 according to the invention. The arrangement corresponded to the arrangement of FIG. 2B and FIG. 3.

In the experiment, on the composite pane 20 according to the prior art, health threatening voltages were regularly measured on the metal object 10. In the case of the composite pane 1 according to the invention, in none of the tests could a health threatening voltage be measured on the metal object 10.

This result was unexpected and surprising for the person skilled in the art.

REFERENCE CHARACTERS 1 composite pane
1.1 first pane, outer pane
1.2 second pane, inner pane
2 first coating
3 intermediate layer
4.1, 4.2, 4.3 busbar
5.1, 5.2, 5.3 feed line
6 second coating
8 insulating layer
9.1, 9.2, 9.3 incision, laser cut
10 metal object
11 current flow
20 composite pane according to the prior art
21 fragmentation of the second pane 1.2
22 open edge of the first coating 2
A-A' section line
I external side of the outer pane 1.1
II internal side of the outer pane 1.1
III internal side of the inner pane 1.2
IV external side of the inner pane 1.2

The invention claimed is:

1. A composite pane, comprising:
a first pane, at least one intermediate layer, and second pane,
a transparent, electrically conductive first coating between the at least one intermediate layer and the first pane and/or between the at least one intermediate layer and the second pane, and
a first busbar and a second busbar, which are connected to the transparent, electrically conductive first coating, the first busbar being connected to a ground potential and the second busbar being connected to a DC voltage of 75 V to 450 V or an AC voltage of 25 V to 450 V,
wherein an area of the transparent, electrically conductive first coating and an area of a transparent, electrically conductive second coating are arranged one over another with at least 80% congruence and insulated from each other,
wherein the transparent, electrically conductive second coating is connected via at least one third busbar to the ground potential, and
wherein the transparent, electrically conductive second coating has a low emissivity of less than 50% that is provided by a layer system that includes:
i) at least one functional layer based on at least one metal from the group, consisting of niobium, tantalum, and zirconium, and
ii) a dielectric layer arranged on a vehicle interior side of the at least one functional layer.

2. The composite pane according to claim 1, wherein the transparent electrically conductive second coating is arranged on a side of an intermediate layer opposite the transparent, electrically conductive first coating.

3. The composite pane according to claim 1, wherein the transparent, electrically conductive second coating is arranged on an outer side of the first pane and/or an outer side of the second pane.

4. The composite pane according to claim 1, wherein the transparent, electrically conductive second coating is connected via an insulating layer to the transparent, electrically conductive first coating.

5. The composite pane according to claim 4, wherein a front of the transparent, electrically conductive first coating is connected via the insulating layer to the transparent, electrically conductive second coating and a back of the transparent, electrically conductive first coating is connected via another insulating layer to another transparent, electrically conductive second coating.

6. The composite pane according to claim 1, wherein the first pane and/or the second pane include glass, or mixtures thereof.

7. The composite pane according to claim 1, wherein the transparent, electrically conductive first coating has a sheet resistance of 1 ohm/square to 10 ohm/square, and/or the transparent, electrically conductive second coating has a sheet resistance of 0.4 ohm/square to 10 ohm/square.

8. The composite pane according to claim 1, wherein the transparent, electrically conductive first coating and/or the transparent, electrically conductive second coating include silver, indium tin oxide, fluorinated tin oxide, or aluminum-doped zinc oxide.

9. The composite pane according to claim 1, wherein the transparent, electrically conductive first coating has n incisions, wherein n is a whole number >1 such that a resistance of the transparent, electrically conductive first coating has a heating output of 300 W/m$^2$ to 4000 W/m$^2$ at a DC voltage of 75 V to 450 V or an AC voltage of 25 V to 450 V.

10. The composite pane according to claim 1, wherein an area of the transparent, electrically conductive first coating and an area of the transparent, electrically conductive second coating are arranged congruently one above the other or the area of the transparent, electrically conductive second coating protrudes beyond the area of the transparent, electrically conductive first coating.

11. The composite pane according to claim 1, wherein the second busbar is connected to a DC voltage of 120 V to 450 V or an AC voltage of 50 V to 450 V.

12. A method for producing the composite pane according to claim 1, comprising:
  laminating the first pane, the intermediate layer, the second pane, at least one transparent, electrically conductive first coating, at least one transparent, electrically conductive second coating, the first busbar, the second busbar, and the third busbar to each other, and
  connecting the at least one transparent, electrically conductive first coating via the first busbar, connecting the at least one transparent, electrically conductive second coating via the third busbar to a ground potential, and connecting the at least one transparent, electrically conductive first coating via a second busbar to a DC voltage of 75 V to 450 V or an AC voltage of 25 V to 450 V.

13. A method comprising:
  using the composite pane according to claim 1 in means of transportation for travel on land, in the air, or on water, in particular, in motor vehicles, for example, as a windshield, rear window, side window, and/or glass roof, as well as a functional individual piece and as a built-in part in furniture, devices, and buildings, in particular as an electrical heater.

14. A method comprising:
  using the composite pane according to claim 1 as a motor vehicle window in motor vehicles that are driven by conversion of electrical energy preferably from accumulators, rechargeable batteries, fuel cells, or internal combustion engine driven generators, in particular in electric vehicles.

15. The composite pane according to claim 6, wherein the glass is flat glass, float glass, quartz glass, borosilicate glass or soda lime glass.

16. The composite pane according to claim 6, wherein the polymers are polyethylene, polypropylene, polycarbonate, or polymethyl methacrylate.

17. The composite pane according to claim 7, wherein the transparent, electrically conductive first coating has a sheet resistance of 3 ohm/square to 5 ohm/square.

18. The composite pane according to claim 7, wherein the transparent, electrically conductive second coating has a sheet resistance of 0.4 ohm/square to 5 ohm/square.

19. The method according to claim 13, wherein the means of transportation are motor vehicles and use of the composite pane is for a windshield, a rear window, a side window, and/or a glass roof.

20. A composite pane, comprising:
  a first pane, at least one intermediate layer, and second pane,
  a transparent, electrically conductive first coating between the at least one intermediate layer and the first pane and/or between the at least one intermediate layer and the second pane, and
  a first busbar and a second busbar, which are connected to the transparent, electrically conductive first coating, the first busbar being connected to a ground potential and the second busbar being connected to a DC voltage of 75 V to 450 V or an AC voltage of 25 V to 450 V,
  wherein an area of the transparent, electrically conductive first coating and an area of a transparent, electrically conductive second coating are arranged one over another with a protrusion of the area of the second coating beyond the area of the first coating by at least 10% and insulated from each other,
  wherein the transparent, electrically conductive second coating is connected via at least one third busbar to the ground potential, and
  wherein the transparent, electrically conductive second coating has low emissivity, and comprises a layer system having:
    at least one functional layer based on at least one metal from the group, consisting of niobium, tantalum, and zirconium, and
    a dielectric layer arranged on a vehicle interior side of the at least one functional layer.

* * * * *